(12) United States Patent
Wang et al.

(10) Patent No.: US 8,755,321 B2
(45) Date of Patent: Jun. 17, 2014

(54) METHOD AND APPARATUS FOR TRANSMITTING AND RECEIVING MULTIMEDIA BROADCAST MULTICAST SERVICES

(75) Inventors: Xuelong Wang, Beijing (CN); Yu Ding, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 748 days.

(21) Appl. No.: 12/670,400

(22) PCT Filed: Jul. 18, 2008

(86) PCT No.: PCT/CN2008/001338
§ 371 (c)(1), (2), (4) Date: Jun. 29, 2010

(87) PCT Pub. No.: WO2009/012649
PCT Pub. Date: Jan. 29, 2009

(65) Prior Publication Data
US 2010/0265857 A1 Oct. 21, 2010

(30) Foreign Application Priority Data
Jul. 23, 2007 (CN) .......................... 2007 1 0119409

(51) Int. Cl.
*H04H 20/71* (2008.01)
*H04J 3/00* (2006.01)
*H04L 12/28* (2006.01)

(52) U.S. Cl.
USPC ........... 370/312; 370/335; 370/337; 370/390; 398/98

(58) Field of Classification Search
USPC ................ 370/312, 335–337, 345, 347, 390; 398/98–99
See application file for complete search history.

(56) References Cited

U.S. PATENT DOCUMENTS

| | | | |
|---|---|---|---|
| 6,980,582 B2 * | 12/2005 | Cai | 375/141 |
| 7,376,115 B2 * | 5/2008 | Tang et al. | 370/342 |
| 8,064,426 B2 * | 11/2011 | Wang et al. | 370/347 |
| 2004/0105402 A1 * | 6/2004 | Yi et al. | 370/312 |
| 2004/0227618 A1 * | 11/2004 | Hwang et al. | 340/7.46 |
| 2006/0068793 A1 * | 3/2006 | Van Lieshout et al. | 455/444 |
| 2006/0146745 A1 * | 7/2006 | Cai et al. | 370/328 |
| 2008/0037468 A1 * | 2/2008 | Zisimopoulos et al. | 370/331 |
| 2008/0101326 A1 * | 5/2008 | Zhang et al. | 370/345 |
| 2008/0311926 A1 * | 12/2008 | Fischer et al. | 455/452.1 |
| 2010/0265857 A1 * | 10/2010 | Wang et al. | 370/294 |

* cited by examiner

*Primary Examiner* — Benjamin H Elliott, IV
(74) *Attorney, Agent, or Firm* — The Bilicki Law Firm, P.C.; Carl A. Hjort, III

(57) ABSTRACT

The present invention discloses a method for transmitting multimedia broadcast multicast services, comprising the following steps: a Time Division Duplex system divides a time slot for bearing multimedia broadcast multicast services into code channels; each multimedia broadcast multicast service to be transmitted is borne on a corresponding divided code channel, and is transmitted to a user equipment based on the single frequency network mode of the multimedia broadcast multicast service. The present invention also discloses a method for receiving multimedia broadcast multicast services, and apparatus for transmitting and receiving multimedia broadcast multicast services, such that time slot resources for bearing multimedia broadcast multicast services are utilized more sufficiently.

13 Claims, 8 Drawing Sheets

S101: one time slot is set in the TDD system and a MBSFN mode is based on to transmit MBMS services, and based on the number of the MBMS services that are simultaneously transmitted by the TDD system under the requirement of a MBMS service center and have a data rate less than a predetermined rate (for example 192kbps), the set time slot is divided into code channels for bearing respective MBMS services to be transmitted.

S102: the respective multimedia broadcast multicast services to be transmitted are born on the corresponding divided code channels, and are transmitted to a UE based on the MBSFN mode.

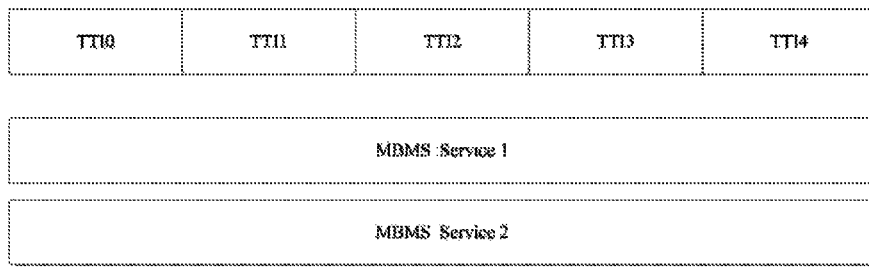

Figure 3
Prior Art one time slot is set in the TDD system and a MBSFN mode is based to transmit MBMS services, and based on the number of the MBMS services that are simultaneously transmitted by the TDD system under the requirement of a MBMS service center and have a data rate less than a predetermined rate (for example 192kbps), the set time slot is divided into code channels for bearing respective MBMS services to be transmitted. — S101 the respective multimedia broadcast multicast services to be transmitted are born on the corresponding divided code channels, and are transmitted to a UE based on the MBSFN mode. — S102

Figure 4

METHOD AND APPARATUS FOR TRANSMITTING AND RECEIVING MULTIMEDIA BROADCAST MULTICAST SERVICES

TECHNICAL FIELD

The present invention relates to mobile communication field, especially to a method and an apparatus for transmitting and receiving multimedia broadcast multicast services.

BACKGROUND ART

With fast development of mobile communication and internet, a large number of mobile multimedia services have appeared, wherein some application services need multiple User Equipments (UE) to receive the same data at the same time, such as television broadcast, video conference, video on demand, online education and interactive game. Compared with general data, such mobile multimedia services have features such as large data amount and long duration. To effectively utilize mobile network resources, the $3^{rd}$ Generation Partnership Project (3GPP) puts forward a Multimedia Broadcast/Multicast Service (MBMS). The MBMS refers to a point-to-multipoint service of sending data from one data source to multiple UEs, thereby sharing network resources. The MBMS can realize not only multicast and broadcast of plain text and low rate messages, but also multicast and broadcast of high rate multimedia services.

3GPP Release7 defines a Multimedia Broadcast/Multicast Service-single frequency network (MBSFN) transmission mode for Frequency Division Duplex (FDD) mode and Time Division Duplex (TDD) mode. The MBSFN transmission mode, also referred to as a single frequency network (SFN) transmission mode, is put forward and used for the transmission of MBMS services. This transmission mode is characterized that the same signal from multiple cells is required to be transmitted to a UE synchronously, and the UE will perform multipathing process to delayed signals and perform physical layer combination, thereby eliminating the interference between cells and even transforming the interference between cells into effective signals to obtain a relatively large signal-to-interference ratio, which thus helps to improve the transmission efficiency of MBMS. The SFN transmission mode in essence requires that the cells participating in the SFN adopt same scrambling code and synchronize between stations. For a Low Chip Rate (LCR) TDD system, it requires inter-station synchronization originally, and thus the cells only need to adopt the same scrambling code during the transmission of the MBMS services in the MBSFN transmission mode.

Currently, the application of MBMS transmissions based on the MBSFN mode to TDD networks refers to using one or more time slots or one independent carrier to transmit a given MBMS service on the basis of the SFN mode; and the application of MBMS transmission based on the MBSFN mode to FDD networks refers to using one independent carrier to transmit a given MBMS service on the basis of the SFN mode.

In 3GPP Release7, when a LCR TDD system transmits MBMS services with low data rate on the basis of the MBSFN mode, the LCR TDD system, taking one conventional service time slot in a LCR TDD subframe as a unit, performs MBSFN transmission of the MBMS services. As shown In FIG. 1, the LCR TDD system assigns two time slots which respectively bear two MBMS services with low data rate and the respective time slots respectively perform the MBSFN transmission to the MBMS services they bear. When the LCR TDD system transmits MBMS services with high data rate based on the MBSFN mode, it combines multiple conventional service time slots to transmit the MBMS services on the basis of the MBSFN mode. As shown in FIG. 2, the LCR TDD system assigns two continuous time slots to bear one MBMS service with high data rate, and the two continuous time slots performs one MBSFN transmission to the MBMS service they bear. The transmission mode, in which the LCR TDD system transmits MBMS services based on the MBSFN mode, requires that the minimum resource unit is one time slot, and one time slot bears one MBMS service at best, which make against resource scheduling for different MBMS services. In other words, when the transmission rate of one MBMS service cannot be accurately matched with an integral number of time slots, the MBMS service, which can be transmitted occupying less than one time slot, has to be transmitted occupying one time slot, which results in waste of bearer resources.

In the 3GPP Release7, for MBMS services with different data rates, the FDD adopts TTI as a repetitive scheduling interval, and transmits multiple MBMS services based on the MBSFN mode in a TDM mode, and the FDD adapts to MBMS services with different data rates at the scheduling frequency. That is, the TTI needs to be adjusted according to the data rates of the MBMS services to be transmitted, and the TTI is adjusted to be relatively longer when the data rate is high, and the TTI is adjusted to be relatively shorter when the data rate is low. As shown in FIG. 3, it is a schematic view illustrating performing MBSFN transmission for two MBMS services in the TDM mode with a TTI (suppose 40 ms) as a repetitive scheduling interval. This transmission mode make against the non-DRX of the UE, and as the TTI in the Release7 can be adjusted, this may lead to occupation of the same TTI resource by multiple services during the scheduling.

SUMMARY OF THE INVENTION

The present invention provides a method for transmitting and receiving multimedia broadcast multicast services, to solve the problems in the prior art of failing to use time slot resources reasonably and sufficiently.

Correspondingly, the present invention further provides an apparatus for transmitting and receiving multimedia broadcast multicast services, to solve the problems in the prior art of failing to use time slot resources reasonably and sufficiently.

The present invention provides a method for transmitting multimedia broadcast multicast services, comprising the following steps:

a Time Division Duplex system divides a time slot for bearing multimedia broadcast multicast services into code channels; and the multimedia broadcast multicast services to be transmitted are borne on the divided corresponding code channels, and are transmitted to a user equipment based on a Multimedia Broadcast/Multicast Service-single frequency network (MB SFN) transmission mode.

The present invention provides a method for receiving multimedia broadcast multicast services, comprising the following steps:

a user equipment, based on the control information for respective multimedia broadcast multicast services, acquires the information of the code channels in the time slot for bearing multimedia broadcast multicast services occupied by the respective multimedia broadcast multicast services; and based on the acquired information of the code channels occupied by the respective multimedia broadcast multicast services, respective corresponding multimedia broadcast multicast services are received on corresponding code channels in the time slot for bearing multimedia broadcast multicast services.

The present invention provides an apparatus for transmitting multimedia broadcast multicast services, comprising:

a code channel dividing unit for dividing a time slot for bearing multimedia broadcast multicast services into code channels; and a transmitting unit for loading respective multimedia broadcast multicast services to be transmitted to the corresponding code channels divided by the code channel dividing unit, and transmitting the same to a user equipment based on a Multimedia Broadcast/Multicast Service-single frequency network (MBSFN) transmission mode.

The present invention provides an apparatus for receiving multimedia broadcast multicast services, comprising:

a code channel information acquiring unit for acquiring, based on the control information for respective multimedia broadcast multicast services, the information of the code channels in a time slot for bearing multimedia broadcast multicast services occupied by the respective multimedia broadcast multicast services; and a receiving unit for receiving, based on the information of the code channels occupied by the respective multimedia broadcast multicast services acquired by the code channel information acquiring unit, respective corresponding multimedia broadcast multicast services on corresponding code channels in the time slot for bearing multimedia broadcast multicast services.

The present invention provides a method for transmitting multimedia broadcast multicast services, comprising the following steps:

a Time Division Duplex system assigns repetitive scheduling intervals and a time slot for bearing multimedia broadcast multicast services in the repetitive scheduling intervals to respective multimedia broadcast multicast services to be transmitted, for bearing the respective multimedia broadcast multicast services to be transmitted; and the respective multimedia broadcast multicast services to be transmitted are borne on a corresponding time slot in a corresponding repetitive scheduling interval, and are transmitted to a user equipment based on a Multimedia Broadcast/Multicast Service-single frequency network (MBSFN) transmission mode.

The present invention provides a method for receiving multimedia broadcast multicast services, comprising the following steps:

a user equipment, based on the control information for current respective multimedia broadcast multicast services, acquires the transmission scheduling parameters of the current respective multimedia broadcast multicast services, which are used to indicate the current repetitive scheduling interval where the respective multimedia broadcast multicast services are borne, a time slot in the repetitive scheduling interval, and a next repetitive scheduling interval; and based on the indication of the transmission scheduling parameters, the respective multimedia broadcast multicast services are received on a corresponding time slot in the corresponding repetitive scheduling interval for bearing the current respective multimedia broadcast multicast services, and the respective multimedia broadcast multicast services are prepared to be received in the next repetitive scheduling interval for bearing the respective multimedia broadcast multicast services.

The present invention provides an apparatus for transmitting multimedia broadcast multicast services, comprising:

a bearer resource assigning unit for assigning repetitive scheduling intervals and time slots for bearing multimedia broadcast multicast services in the repetitive scheduling intervals for respective multimedia broadcast multicast services to be transmitted, for bearing the respective multimedia broadcast multicast services to be transmitted; and a transmitting unit for loading the respective multimedia broadcast multicast services to be transmitted on a corresponding time slot in a corresponding repetitive scheduling interval assigned by the bearer resource assigning unit, and transmitting the same to a user equipment based on a Multimedia Broadcast/Multicast Service-single frequency network (MBSFN) transmission mode.

The present invention provides an apparatus for receiving multimedia broadcast multicast services, comprising:

a transmission scheduling parameter acquiring unit for acquiring, based on the control information for current respective multimedia broadcast multicast services, the transmission scheduling parameters of the current respective multimedia broadcast multicast services, wherein the transmission scheduling parameters are used to indicate the current repetitive scheduling interval where the respective multimedia broadcast multicast services are borne, a time slot in the repetitive scheduling interval, and a next repetitive scheduling interval; and a receiving unit for receiving, based on the indication of the transmission scheduling parameters, the respective multimedia broadcast multicast services on a corresponding time slot in a corresponding repetitive scheduling interval for bearing the current respective multimedia broadcast multicast services, and preparing to receive the respective multimedia broadcast multicast services in the next repetitive scheduling interval for bearing the respective multimedia broadcast multicast services.

The present invention provides a method for transmitting multimedia broadcast multicast services, comprising the following steps:

a Time Division Duplex system divides an additional time slot to be borrowed by multimedia broadcast multicast services to be transmitted among the time slots for bearing the multimedia broadcast multicast services into code channels; and bears the multimedia broadcast multicast services to be transmitted on an integral number of time slots for bearing multimedia broadcast multicast services and on the code channels in the additional time slot as borrowed, and are transmitted to a user equipment based on a Multimedia Broadcast/Multicast Service-single frequency network (MBSFN) transmission mode.

The present invention provides a method for receiving multimedia broadcast multicast services, comprising the following steps:

a user equipment, based on the control information of respective multimedia broadcast multicast services, acquires the information of the complete time slots for bearing multimedia broadcast multicast services occupied by the respective multimedia broadcast multicast services, and the information of code channels in an additional time slot; and based on the acquired information of the complete time slots occupied by the respective multimedia broadcast multicast services and the information of code channels in the additional time slot, receives respective multimedia broadcast multicast services in a corresponding complete time slot and corresponding code channels in the additional time slot for bearing multimedia broadcast multicast services.

The present invention provides an apparatus for transmitting multimedia broadcast multicast services, comprising:

a code channel dividing unit for dividing an additional time slot to be borrowed by multimedia broadcast multicast services to be transmitted among the time slots for bearing the multimedia broadcast multicast services into code channels; and a transmitting unit for loading the multimedia broadcast multicast services to be transmitted to an integral number of time slots for bearing multimedia broadcast multicast services and on the code channels in the additional time slot divided by the code channel dividing unit, and transmitting the same to a user equipment based on a Multimedia Broadcast/Multicast Service-single frequency network (MBSFN) transmission mode.

The present invention provides an apparatus for receiving multimedia broadcast multicast services, comprising:

a bearer information acquiring unit for acquiring, based on the control information of respective multimedia broadcast multicast services, the information of the complete time slots for bearing multimedia broadcast multicast services occupied by the respective multimedia broadcast multicast services, and the information of code channels in an additional time slot; and a receiving unit for receiving, based on the information of complete time slots occupied by the respective multimedia broadcast multicast services acquired by the bearer information acquiring unit and the information of code channels in the additional time slot, the respective multimedia broadcast multicast services on a corresponding complete time slot and corresponding code channels in the additional time slot for bearing multimedia broadcast multicast services.

The multimedia broadcast multicast service CDM transmitting and receiving method and apparatus provided by the present invention divide a time slot for bearing MBMS services into multiple code channels, for bearing multiple MBMS services to be transmitted with low data rate, such that multiple MBMS services with low data rate can be transmitted in one time slot, thereby reasonably and sufficiently using the time slot resources.

In addition, the multimedia broadcast multicast service coordination TDM transmitting and receiving method and apparatus provided by the present invention reasonably and sufficiently use time slot resources, and also help the DRX of the UE.

In addition, the multimedia broadcast multicast service shared time slot transmitting and receiving method and apparatus provided by the present invention assign an integral number of complete time slots and a part of the code channels of an additional time slot to MBMS that is not suitable to be transmitted in an integral number of time slots, thereby reasonably and sufficiently using the time slot resources.

DESCRIPTION OF THE ACCOMPANYING DRAWINGS

FIG. 3 is a schematic view illustrating performing MBSFN transmission for two MBMS services on the basis of TDM mode with a TTI (suppose 40 ms) as a repetitive scheduling interval;

FIG. 4 is a flow chart of for realizing a multimedia broadcast multicast service CDM transmission method according to the present invention;

DETAILED DESCRIPTION OF THE INVENTION

The present invention provides multimedia broadcast multicast service CDM transmitting and receiving method and apparatus, with the basic concept as follows: a time slot for bearing MBMS services is divided into multiple code channels to bear multiple MBMS services to be transmitted with low data rate, so that one time slot can be used to transmit multiple MBMS services with low data rate at the same time, thereby reasonably and sufficiently using time slot resources.

Figure 1:
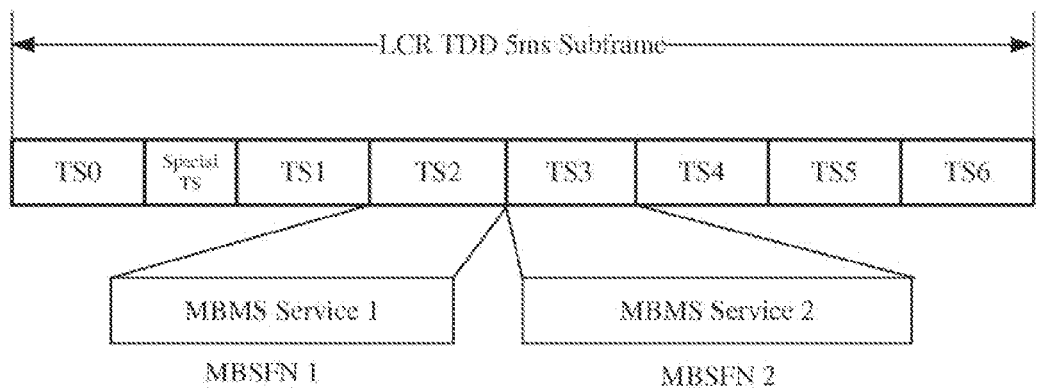
FIG. 1 is a schematic view illustrating that the LCR TDD system assigns two time slots to bear two MBMS services with low data rate respectively.
Figure 2:
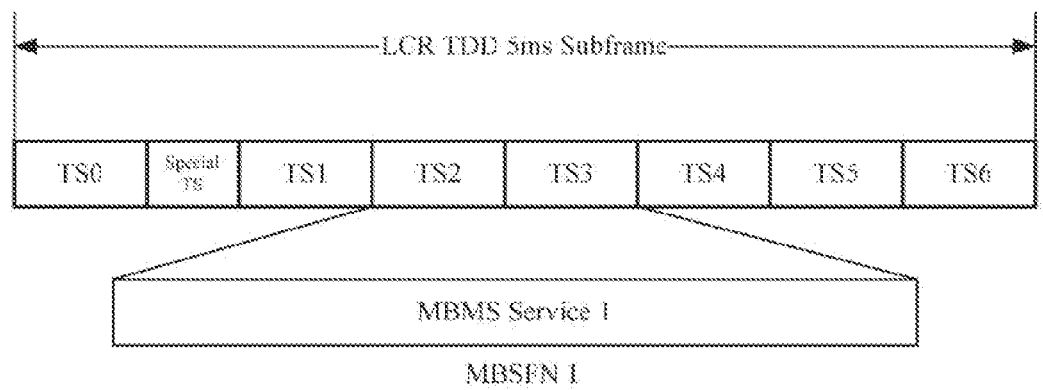
FIG. 2 is a schematic view illustrating that the LCR TDD system assigns two continuous time slots to bear one MBMS service with high data rate.
Figure 5:
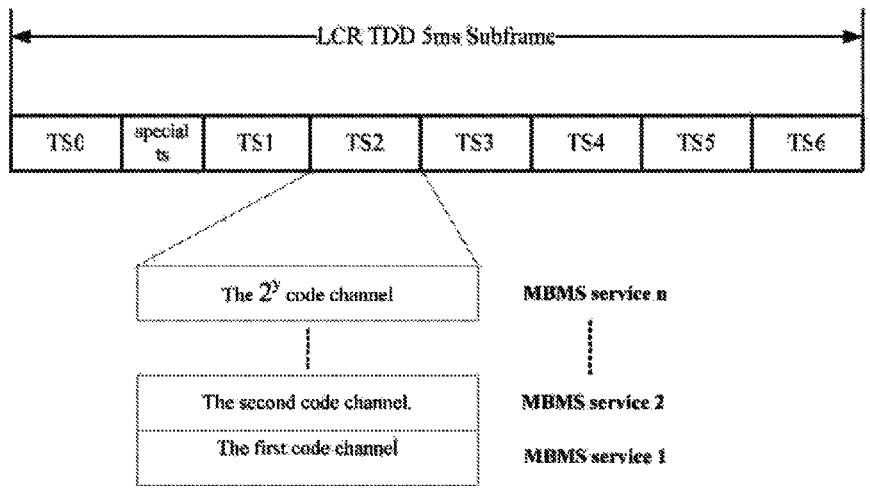
FIG. 5 is a schematic view illustrating the division of code channels of the multimedia broadcast multicast service CDM transmission method according to the present invention.
Figure 6:
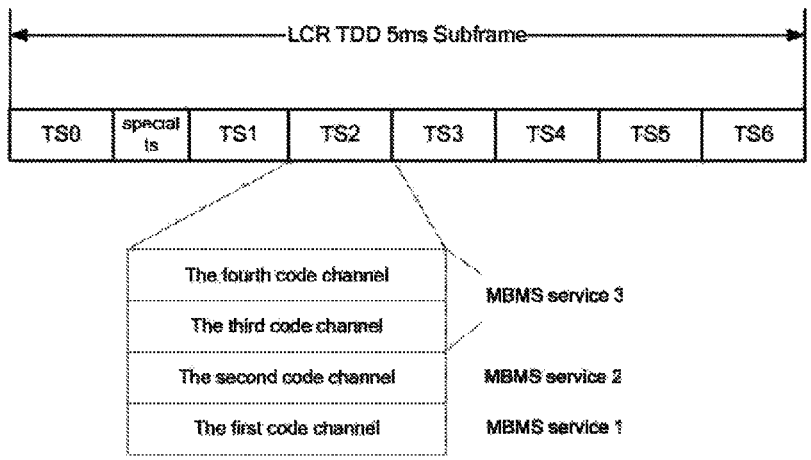
FIG. 6 is a schematic view illustrating the division of the time slot TS2 into 4 code channels according to the embodiment of the multimedia broadcast multicast service CDM transmission method.

FIG. 4 illustrates a flow chart of a method for realizing multimedia broadcast multicast service CDM transmission, comprising the following steps:

S101: one time slot is set in a TDD system to transmit MBMS services based on a MBSFN mode, and based on the number of the MBMS services that are simultaneously transmitted by the TDD system under the requirement of a MBMS service center and have a data rate less than a predetermined rate (for example, 192 kbps), the set time slot is divided into code channels for bearing respective MBMS services to be transmitted; as shown in PG. 5, when the MBMS service center requires the TDD system to simultaneously transmit n MBMS services with a rate less than a predetermined rate, if n=2y (n,y∈N), divide the time slot for bearing multimedia broadcast multicast services into n code channels, and assign one code channel for each MBMS service to be transmitted, and if 2y−1<n<2y, divide the time slot for bearing multimedia broadcast multicast services into 2y code channels, and assign the 2y code channels to the n multimedia broadcast multicast services to be transmitted, and it is allowed that the respective MBMS services occupy different numbers of code channels. For example, as shown in FIG. 6, the TDD system sets that the time slot TS2 is used and the MBSFN mode is based on to transmit three MBMS services with a data rate less than a predetermined value at the same time, and as 21<3<22, the time slot TS2 is divided into four code channels to bear three MBMS services to be transmitted, wherein the TDD system assigns the first code channel of the time slot TS2 for MBMS service 1, the second code channel of the time slot TS2 for MBMS service 2, and the third and the fourth code channels of the time slot TS2 for MBMS service 3. Without doubt, said three MBMS services to be transmitted may also occupy the four code channels in the time slot TS2 in other modes.

S102: respective multimedia broadcast multicast services to be transmitted are code division multiplexed to the code channels of the set time slot for bearing MBMS services, and are transmitted to a UE based on the MBSFN mode; wherein, before transmitting, the multimedia broadcast multicast services borne in respective code channels in same multimedia broadcast multicast services time slot are modulated based on same scrambling code ID.

Figure 7:
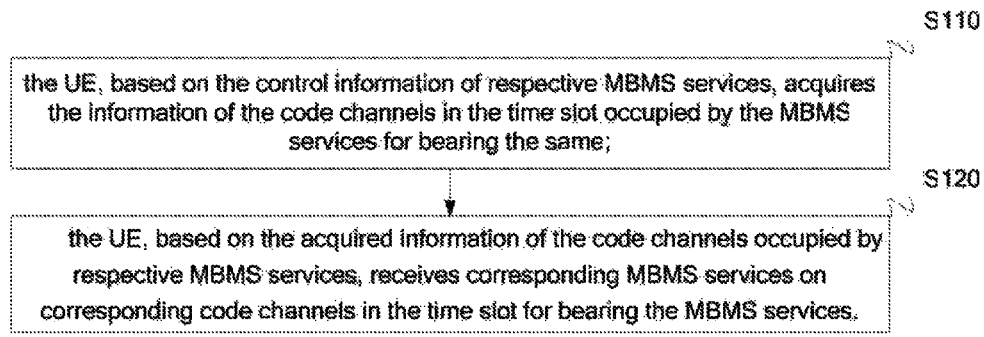
FIG. 7 is a flow chart illustrating a method for realizing multimedia broadcast multicast service CDM receiving method according to the present invention.

FIG. 7 illustrates a flow chart of a method for realizing multimedia broadcast multicast service CDM receiving, comprising the following steps:

Before transmitting the MBMS services, the system sets that the code channels in the MBMS service time slot respectively modulate the MBMS services they bear, and the code channels use same scrambling code ID during modulation.

S110: the UE acquires respective MBMS service control information, comprising the information of the code channels in the time slot for bearing multimedia broadcast multicast services occupied by the respective multimedia broadcast multicast services; and S120: the UE, based on the acquired information of the code channels occupied by the respective multimedia broadcast multicast services, receives respective corresponding multimedia broadcast multicast services on corresponding code channels in the time slot for bearing multimedia broadcast multicast services.

Wherein, the UE can only receive its interested MBMS services as needed. For example, for three MBMS services adopting the code channel assigning mode shown in FIG. 6, the system instructs the UE based on the control information, and the MBMS service 2 is transmitted on the second code channel in the time slot TS2, so that the UE that is only interested in the MBMS service 2 can only receive the MBMS service 2 borne in the second code channel in the time slot TS2 according to this information.

To realize the methods of the CDM transmitting and receiving of the above MBMS service, the MBMS service transmitting apparatus needs to comprise:

a code channel dividing unit for dividing a time slot for bearing multimedia broadcast multicast services into code channels; and a transmitting unit for loading respective multimedia broadcast multicast services to be transmitted to corresponding code channels divided by the code channel dividing unit, and transmitting the same to a user equipment based on a Multimedia Broadcast/Multicast Service-single frequency network (MBSFN) transmission mode.

Correspondingly, the MBMS service receiving apparatus needs to comprise:

a code channel information acquiring unit for acquiring, based on the control information of respective multimedia broadcast multicast services, the information of the code channels in the time slot for bearing multimedia broadcast multicast services occupied by the respective multimedia broadcast multicast services; and a receiving unit for receiving, based on the information of the code channels occupied by the respective multimedia broadcast multicast services acquired by the code channel information acquiring unit, respective corresponding multimedia broadcast multicast services on corresponding code channels in the time slot for bearing multimedia broadcast multicast services.

A processing unit added in the above MBMS service transmitting apparatus and the MBMS service receiving apparatus to realize CDM transmitting and receiving of the MBMS according to the present invention can be realized by software programs on the one hand, and can also be realized by improving and updating current hardwares on the other hand.

In addition, the multimedia broadcast multicast service coordination TDM transmitting and receiving method and apparatus provided by the present invention reasonably and sufficiently use time slot resources, and are also good for the non-DRX of the UE.

Figure 8:
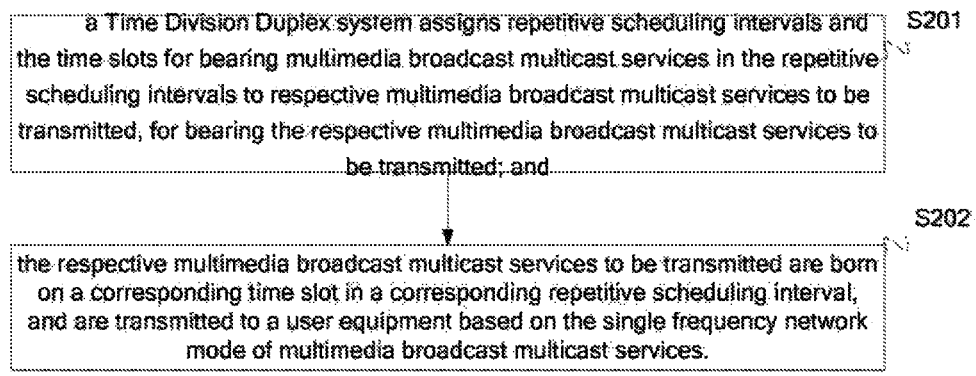
FIG. 8 is a flow chart illustrating a method for realizing multimedia broadcast multicast service coordination TDM transmission method according to the present invention.
Figure 9:
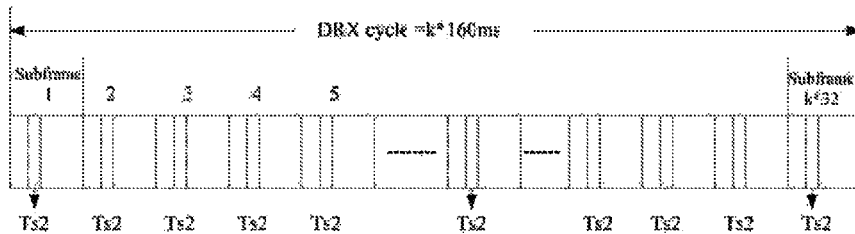
FIG. 9 is a schematic view illustrating the distribution of the time slots for bearing MBMS services in one DRX cycle.

FIG. 8 is a flow chart of a method for realizing MBMS coordination TDM transmitting according to the present invention, comprising the following steps:

S201: one time slot is set in a TDD system to transmit MBMS services based on the MBSFN mode, and based on the number of the MBMS services that are transmitted by the TDD system under the requirement of a MBMS service center and the data rate, the TDD system assigns time slot resources to respective MBMS services to be transmitted, comprising: a repetitive scheduling interval occupied by the respective MBMS services, scheduling starting points of the respective MBMS services in the occupied repetitive scheduling interval, and lengths of the repetitive scheduling interval where the respective MBMS services are borne; wherein, the repetitive scheduling interval can be a DRX cycle in UMTS (Universal Mobile Telecommunications System), which is about within the range from 160 ms to 1280 ms and increases by multiples that is, DRX cycle=k160 ms, (k<9, k∈N). As shown in FIG. 9, k160 ms/5ms subframes, i.e. k32 subframes, will appear in one DRX cycle, and also as anyone of seven conventional service time slots appears once in one subframe, one DRX cycle comprises k32 set time slots. Based on the number of the MBMS services that are simultaneously transmitted by the TDD system under the requirement of a MBMS service center and have a data rate less than a predetermined rate and the data rate of such MBMS services, determine how to assign k32 time slots for bearing the MBMS services comprised in one DRX cycle to the respective MBMS services to be transmitted. More continuous time slots can be assigned to MBMS services with high data rate, while less continuous time slots can be assigned to MBMS services with low data rate. However, the number of the set time slots occupied by each MBMS service to be transmitted is an integral multiple of 8, that is, each MBMS service to be transmitted needs to occupy an integral multiple of 40 ms.

Figure 10:
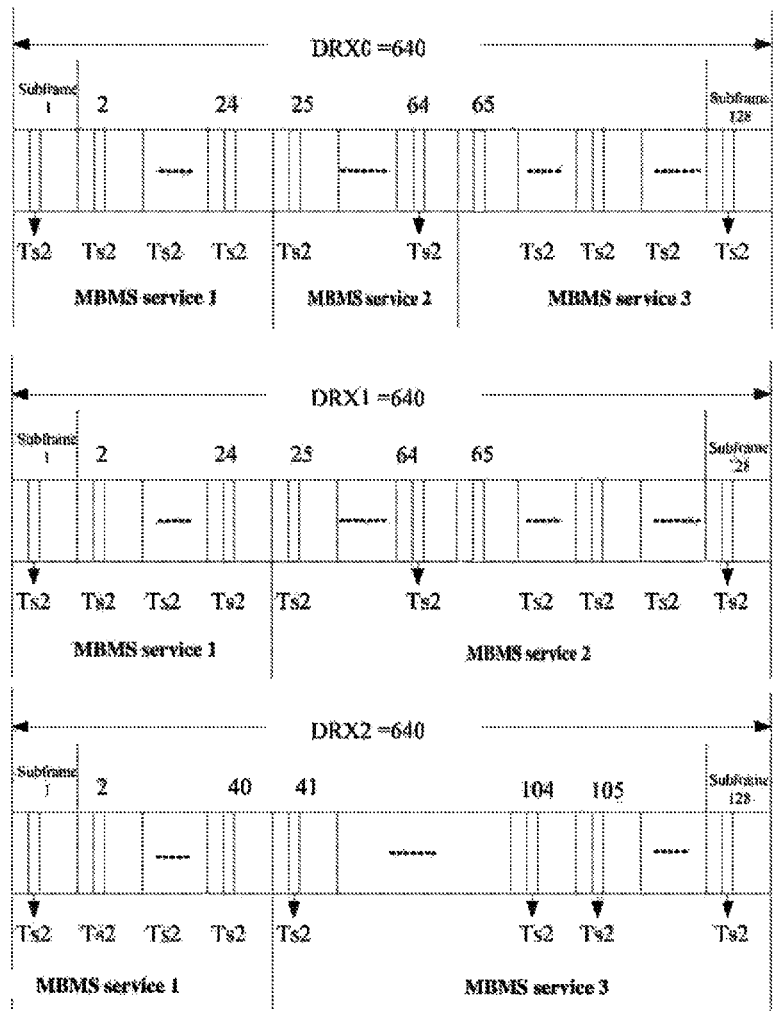
FIG. 10 is a schematic view illustrating the distribution of the bearer resources of three MBMS services to be transmitted in the embodiment of the multimedia broadcast multicast service coordination TDM transmission method according to the present invention.

For example, as shown in FIG. 10, the TDD system sets that the time slot TS2 is used and the MBSFN mode is based on to transmit MBMS services, and the MBMS service center requires the TDD system to transmit MBMS service 1, MBMS service 2 and MBMS service 3, and according to the data rates of the three MBMS services to be transmitted, the TDD system assigns time slot resources for the respective MBMS services to be transmitted: assign three DRX cycles with a length of 640 ms for the three MBMS services to be transmitted: DRX0 cycle, DRX1 cycle, and DRX2 cycle, wherein, all the time slots TS2 in subframes 1-24 based on the DRX0 cycle bear the MBMS service 1, all the time slots TS2 in subframes 25-64 bear the MBMS service 2, and all the time slots TS2 in subframes 65-128 bear the MBMS service 3; in addition, all the time slots TS2 in subframes 1-24 based on the DRX1 cycle bear the MBMS service 1 and all the time slots TS2 in subframes 25-128 bear the MBMS service 2; and in addition, all the time slots TS2 in subframes 1-40 based on the DRX2 cycle bear the MBMS service 1 and all the time slots TS2 in subframes 41-128 bear the MBMS service 3.

In addition, the TDD system can assign discontinuous repetitive scheduling intervals for MBMS services to be transmitted, for example, the MBMS service 3 mentioned above is assigned on the first repetitive scheduling interval and the third repetitive scheduling interval, that is, the repetitive scheduling intervals assigned to the MBMS service 3 are discontinuous.

S202: load respective MBMS services to be transmitted to the time slot resources assigned by the TDD system, and transmit the same to a UE based on the MBSFN mode; as shown in FIG. 10, in the first 120 ms of the DRX0 cycle 24, time slots TS2 are used to bear the MBMS service 1 which is then transmitted to the UE, and in the following 200 ms, 40 time slots TS2 are used to bear the MBMS service 2 which is then transmitted to the UE, and in the remaining 320 ms, 64 time slots TS2 are used to bear the MBMS service 3 which is then transmitted to the UE; in the first 120 ms of the next repetitive interval cycle DRX1 cycle, 24 time slots TS2 are used to bear the MBMS service 1 which is then transmitted to the UE, and in the remaining 520 ms, 104 time slots TS2 are used to bear the MBMS service 2 which is then transmitted to the UE; and in the first 200 ms of the third repetitive interval cycle DRX2 cycle, 40 time slots TS2 are used to bear the MBMS service 1 which is then transmitted to the UE, and in the remaining 440 ms, 88 time slots TS2 are used to bear the MBMS service 3 which is then transmitted to the UE.

Figure 11:
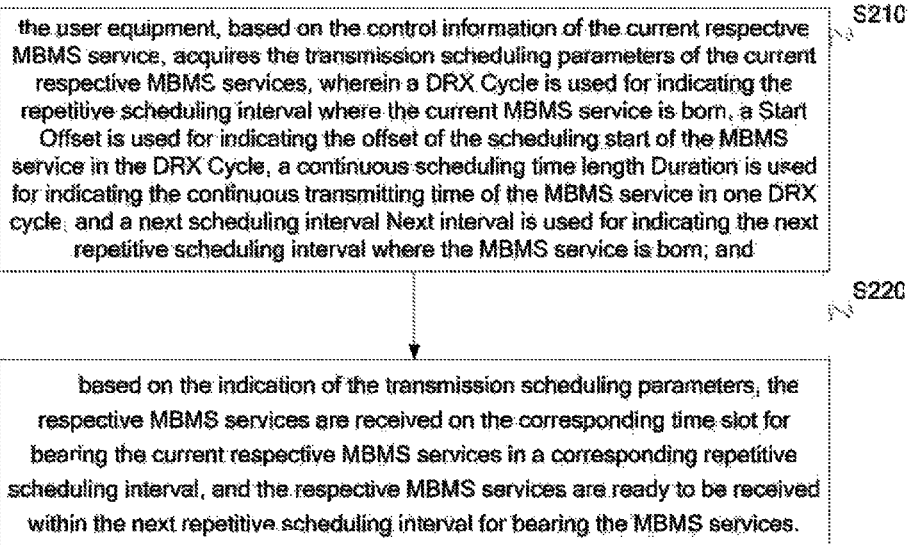
FIG. 11 is a flow chart illustrating a method for realizing multimedia broadcast multicast service coordination TDM receiving method according to the present invention.

FIG. 11 is a flow chart of a method for realizing MBMS coordination TDM receiving, comprising the following steps:

S210: the user equipment, based on the control information for current respective multimedia broadcast multicast service, acquires the transmission scheduling parameters of the current respective multimedia broadcast multicast services, and the transmission scheduling parameters of each current MBMS service comprise: a DRX Cycle for indicating the repetitive scheduling interval where the current MBMS service is borne, a Start Offset for indicating the offset of the scheduling start of the MBMS service in the DRX Cycle, a continuous scheduling time length Duration for indicating the continuous transmission time of the MBMS service in one cycle (wherein, parameters Start Offset and Duration jointly indicate the time slots for transmitting the MBMS service in the DRX cycle), and a next scheduling interval Next interval for indicating the next repetitive scheduling interval where the MBMS service is borne; and S220: based on the indication of the transmission scheduling parameters, receive the respective multimedia broadcast multicast services on a corresponding time slot for bearing the current respective multimedia broadcast multicast services in a corresponding repetitive scheduling interval, and prepare to receive the respective multimedia broadcast multicast services within the next repetitive scheduling interval for bearing the respective multimedia broadcast multicast services.

Figure 12:
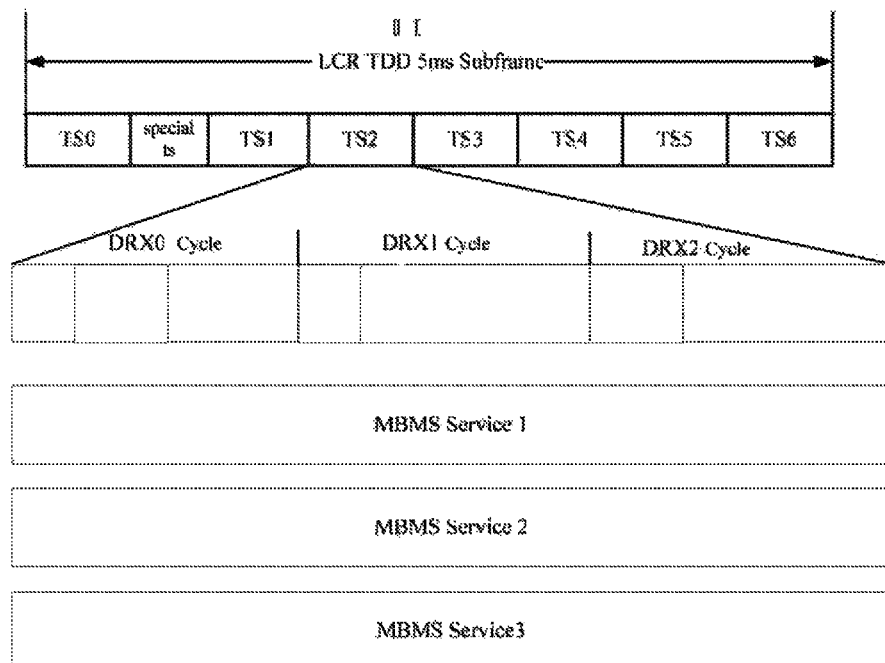
FIG. 12 is a schematic view illustrating that three MBMS services occupy bearer resources in the embodiment of the multimedia broadcast multicast service coordination TDM receiving method according to the present invention.

Wherein, for MBMS services occupying continuous repetitive scheduling intervals, the UE needs to continuously receive the same, and for MBMS services occupying discontinuous repetitive scheduling intervals, the UE may receive the same in the DRX mode; as shown in FIG. 12, if the UE only receives the MBMS service 3, it can select the DRX mode: obtain from the control signaling of the MBMS service 3 the transmitting scheduling parameters of the MBMS service 3: DRX0 Cycle=640 ms, Start Offset=320 ms, Duration=320 ms, and Next interval=DRX2 Cycle, indicating the UE to receive the MBMS service 3 within the time slot TS2 from $320^{th}$ ms to $640^{th}$ (320 ms+320 ms)ms in the repetitive scheduling interval DRX0 Cycle with a length of 640 ms, and to prepare to receive the data of the MBMS service 3 within the repetitive scheduling interval DRX2 Cycle; DRX2 Cycle=640 ms, Start Offset=200 ms, Duration=440 ms, and Next interval=NULL, indicating the UE to receive the data of the MBMS service 3 within the time slot TS2 from $200^{th}$ ms to $640^{th}$ ms (200 ms+440 ms) in the repetitive scheduling interval DRX2 Cycle with a length of 640 ms.

To realize coordination TDM transmitting and receiving of the above MBMS services, the MBMS service transmitting apparatus needs to comprise:

a bearer resource assigning unit for assigning repetitive scheduling intervals and time slots for bearing multimedia broadcast multicast services in the repetitive scheduling intervals for respective multimedia broadcast multicast services to be transmitted to bear the respective multimedia broadcast multicast services to be transmitted; and a transmitting unit for loading the respective multimedia broadcast multicast services to be transmitted to a corresponding time slot in a corresponding repetitive scheduling interval assigned by the bearer resource assigning unit, and transmitting the same to a user equipment based on a Multimedia Broadcast/Multicast Service-single frequency network (MB SFN) transmission mode.

Correspondingly, the MBMS service receiving apparatus needs to comprise:

a transmission scheduling parameter acquiring unit for acquiring, based on the control information of current respective multimedia broadcast multicast services, the transmission scheduling parameters of the current respective multimedia broadcast multicast services, which are used to indicate a current repetitive scheduling interval where the respective multimedia broadcast multicast services are borne, a time slot in the repetitive scheduling interval, and a next repetitive scheduling interval; and a receiving unit for receiving, based on the indication of the transmission scheduling parameters, the respective multimedia broadcast multicast services on a corresponding time slot in a corresponding repetitive scheduling interval for bearing the current respective multimedia broadcast multicast service, and preparing to receive the respective multimedia broadcast multicast services within the next repetitive scheduling interval for bearing the respective multimedia broadcast multicast services.

Figure 13:
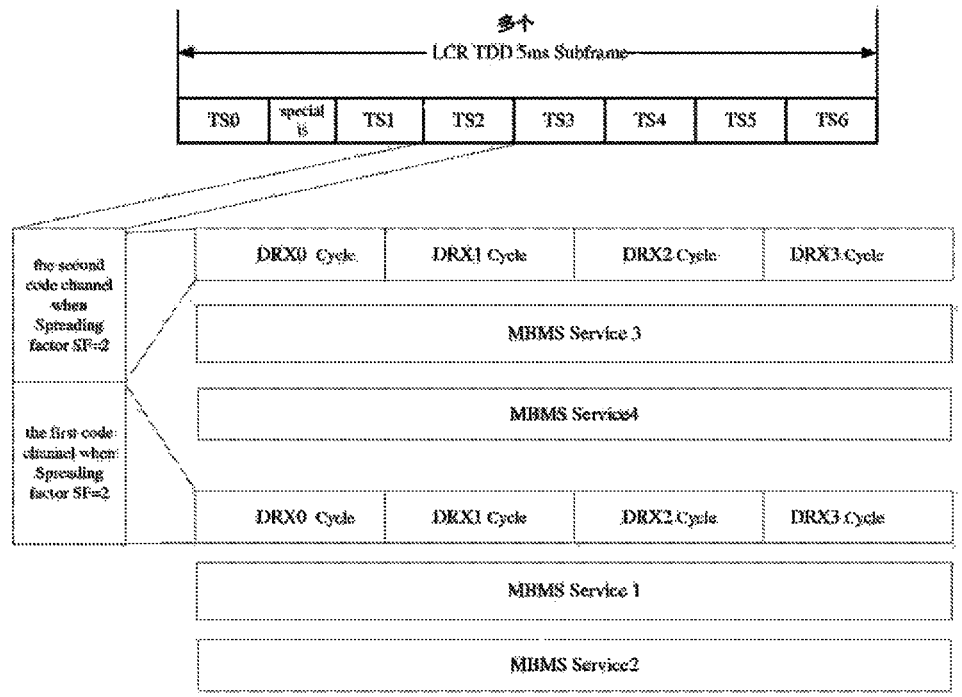
FIG. 13 illustrates a combination method based on the multimedia broadcast multicast service CDM mode and the coordination TDM mode according to the present invention.

The MBMS transmitting method can also combine the CDM mode and the TDM mode, and FIG. 13 illustrates a method mixing the CDM mode and the TDM mode.

For example, in the coordination TDM mode, for the transmitting method, the Time Division Duplex system divides a time slot for bearing multimedia broadcast multicast services into code channels, and loads the respective multimedia broadcast multicast services to be transmitted to corresponding divided code channels.

As an embodiment of the present invention, the step of dividing a time slot for bearing multimedia broadcast multicast services into code channels specifically comprises: determining the number n of the multimedia broadcast multicast services to be transmitted; if n=2y (n,y∈N), dividing one time slot for bearing multimedia broadcast multicast services into n code channels, and assigning one code channel for each multimedia broadcast multicast service to be trans mitted; and if 2y−1<n<2y, dividing one time slot for bearing multimedia broadcast multicast services into 2y code channels, and assigning the 2y code channels to the n multimedia broadcast multicast services to be transmitted.

As an embodiment of the present invention, the numbers of the code channels for bearing respective multimedia broadcast multicast services to be transmitted are not equal to each other.

As an embodiment of the present invention, the multimedia broadcast multicast services borne on respective code channels in the time slot of same multimedia broadcast multicast services are modulated based on same scrambling code ID.

Correspondingly, for the transmitting apparatus, the bearer resource assigning unit further comprises a code channel dividing unit for dividing a time slot for bearing multimedia broadcast multicast services into code channels; and the transmitting unit is used for loading respective multimedia broadcast multicast services to be transmitted to the corresponding code channels divided by the code channel dividing unit, and transmitting the same to a user equipment based on a Multimedia Broadcast/Multicast Service-single frequency network (MBSFN) transmission mode.

For the receiving method, it further comprises the following steps: a user equipment, based on the control information of respective multimedia broadcast multicast services, acquires the information of the code channels in the time slot for bearing multimedia broadcast multicast services occupied by the respective multimedia broadcast multicast services; and based on the acquired information of the code channels occupied by the respective multimedia broadcast multicast services, receives respective corresponding multimedia broadcast multicast services on the corresponding code channels in the time slot for bearing multimedia broadcast multicast services.

Correspondingly, for the receiving apparatus, the transmission scheduling parameter acquiring unit further comprises a code channel information acquiring unit for acquiring, based on the control information of the respective multimedia broadcast multicast services, code channel information in the time slot for bearing multimedia broadcast multicast services occupied by the respective multimedia broadcast multicast services; and the receiving unit is used for receiving, based on the information of the code channels occupied by the respective multimedia broadcast multicast services acquired by the code channel information acquiring unit, respective corresponding multimedia broadcast multicast services on corresponding code channels in the time slot for bearing multimedia broadcast multicast services.

A processing unit added in the above MBMS service transmitting apparatus and the MBMS service receiving apparatus to realize the combination of the CDM and coordination TDM transmitting and receiving of the MBMS according to the present invention can be realized by software programs on the one hand, and can also be realized by improving and updating current hardware on the other hand.

The present invention also provides MBMS shared time slot transmitting and receiving method and apparatus, which assign an integral number of complete time slots and a part of the code channels of one additional time slot to a MBMS that is not suitable to be transmitted in an integral number of time slots, and the one additional time slot can be borrowed and shared by multiple MBMS services to be transmitted, thereby reasonably and sufficiently using the time slot resources.

Figure 14:
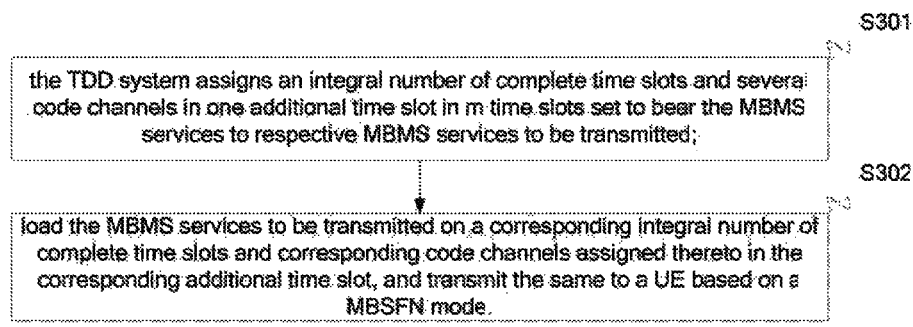
FIG. 14 is a flow chart of a method for transmitting realizing multimedia broadcast multicast service shared time slot according to the present invention.

FIG. 14 is a flow chart of a transmitting method for realizing multimedia broadcast multicast service shared time slot according to the present invention, comprising the following steps:

S301: m time slots are set in the TDD system and MBSFN mode is based on to transmit MBMS services, and when the MBMS service center requires the TDD system to simultaneously transmit multiple MBMS services having a data rate larger than a predetermined value (for example 512 kbps), for MBMS services not suitable to be borne by an integral number of complete time slots, the TDD system assigns to the same an integral number of complete time slots (for example., one time slot) and several code channels in one additional time slot, to bear the MBMS services to be transmitted, and according to the number of the MBMS services which borrow one additional time slot, the borrowed additional time slot is divided into code channels, if the number n of the MBMS services borrowing the additional time slot equals to 2y (n,y∈N), divide the borrowed additional time slot into n code channels, and assign one code channel to each multimedia broadcast multicast service to be transmitted that borrows the additional time slot; and if $2y-1<n<2y$, divide the borrowed additional time slot into 2y code channels, and assign the 2y code channels to the n multimedia broadcast multicast services to be transmitted that borrow the additional time slot, and it is allowed that the MBMS services occupy different numbers of code channels. In addition, for MBMS services with a data rate suitable to be borne by an integral number of complete time slots, the TDD system assigns to the same an integral number of complete time slots, to bear the MBMS services to be transmitted.

S302: load the respective MBMS services to be transmitted to an corresponding integral number of time slots for bearing the MBMS services and to the corresponding code channels within the additional time slot, and transmit the MBMS services to a UE on the basis of the MBSFN mode; wherein, before transmitting the MBMS services, the same MBMS service borne on the integral number of complete time slots is modulated based on the same scrambling code ID; in addition, the same MBMS service borne on the code channels in the same additional time slot is modulated based on the same scrambling code ID. For example, the MBMS service 1 is borne on the overall time slots of TS1 and TS2 and the first three code channels of 8 code channels in the TS3, and then the two complete time slots TS1 and TS2 bearing the MBMS service 1 use the same scrambling code ID as modulating of the data of the MBMS service 1, and the first three code channels of the TS3 bearing the MBMS service 1 use the same scrambling code ID as modulating the data of the MBMS service 1.

Figure 15:
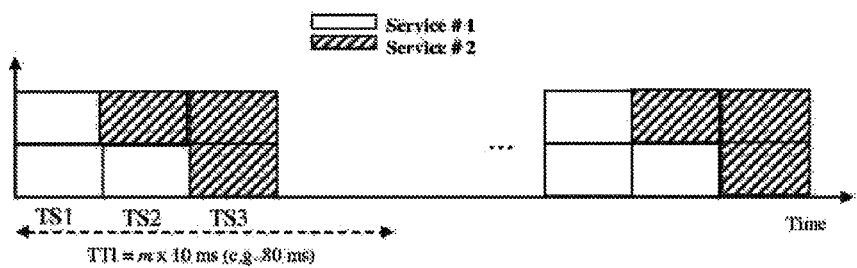
FIG. 15 is a schematic view illustrating that two MBMS services occupy bearer resources in the embodiment of the method of transmitting a multimedia broadcast multicast service shared time slot according to the present invention.

An embodiment of the transmitting method for realizing MBMS shared time slot comprises the following steps:

S3001: a TDD system sets that three time slots of TS1, TS2 and TS3 are used and the MBSFN mode is based on to transmit MBMS services, and if the MBMS service center requires the TDD system to simultaneously transmit 2 services, and the data rates of the 2 services are both larger than the bearing ability of one time slot while less than the bearing ability of two time slots, as shown in FIG. 15, the TDD system borrows the time slot TS2 as an additional time slot for the MBMS service 1 and the MBMS service 2, and divides the additional time slot TS2 into two code channels.

S3002: load the MBMS service 1 to be transmitted to the complete time slot TS1 and the first code channel of the time slot TS2, load the MBMS service 2 to be transmitted to the second code channel of the time slot TS2 and the complete time slot TS3, and transmit them to the UE based on the MBSFN mode.

Figure 16:
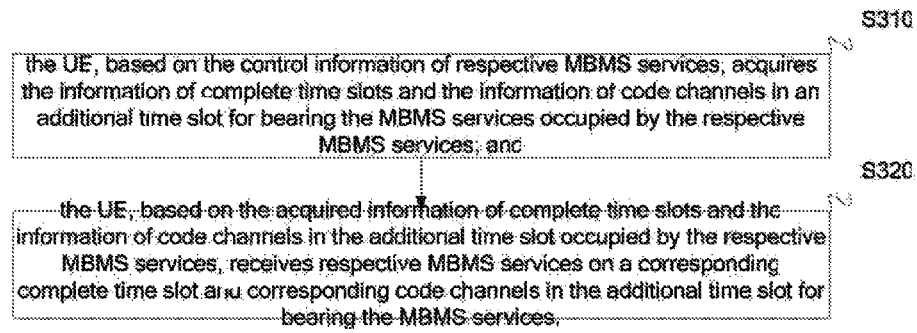
FIG. 16 is a flow chart of a method for receiving a multimedia broadcast multicast service shared time slot according to the present invention.

FIG. 16 illustrates a flow chart of a receiving method for realizing MBMS shared time slot, comprising the following steps:

S310: the user equipment, based on the control information of respective multimedia broadcast multicast services, acquires the information of complete time slots for bearing multimedia broadcast multicast services occupied by the respective multimedia broadcast multicast services, and the information of code channels in the additional time slot; and S320: the user equipment, based on the acquired information of complete time slots occupied by the respective multimedia broadcast multicast services and the information of code channels in the additional time slot, receives respective multimedia broadcast multicast services on a corresponding complete time slot and corresponding code channels in the additional time slot for bearing multimedia broadcast multicast services.

Wherein, a UE subscribing for the above transmitted MBMS services may receive some of the transmitted MBMS services according to its own needs.

Based on the above embodiment of the transmitting method for realizing MBMS shared time slot, an embodiment of the receiving method for realizing MBMS shared time slot is described as follows:

S3010: a UE subscribing for the above transmitted MBMS services, based on the control information of the MBMS service 1, acquires the information of the overall time slot TS1 and the first code channel of the time slot TS2 occupied by the MBMS service 1 for bearing the MBMS services, and the information of the second code channel of the time slot TS2 and the overall time slot TS3 occupied by the MBMS service 2 for bearing the MBMS services; and S3020: the UE, based on the acquired information of the complete time slots and the code channels in the additional time slot as occupied by the MBMS service 1 and the MBMS service 2, receives the MBMS service 1 on the overall time slot TS1 and the first code channel of the time slot TS2, and receives the MBMS service 2 on the second code channel of the TS2 and the overall time slot TS3.

Wherein, the UE can only receive some of the transmitted MBMS services according to its own needs, for example, it only receives the MBMS service 2 on the second code channel of the TS2 and the overall time slot TS3.

To realize the above transmitting and receiving methods for realizing time slot sharing of the MBMS services, the MBMS service transmitting apparatus needs to comprise:

a code channel dividing unit for dividing an additional time slot to be borrowed by multimedia broadcast multicast services to be transmitted into code channels in a time slot for bearing the multimedia broadcast multicast services; and a transmitting unit for loading the multimedia broadcast multicast services to be transmitted to an integral number of time slots for bearing multimedia broadcast multicast services and to the code channels within the borrowed additional time slot divided by the code channel dividing unit, and transmitting the same to a user equipment based on a Multimedia Broadcast/Multicast Service-single frequency network (MBSFN) transmission mode.

Correspondingly, the MBMS service receiving apparatus need to comprises:

a bearer information acquiring unit for acquiring, based on the control information of respective multimedia broadcast multicast services, the information of the complete time slots for bearing multimedia broadcast multicast services occupied by the respective multimedia broadcast multicast services, and the information of code channels in an additional time slot; and a receiving unit for receiving, based on the information of the complete time slots occupied by the respective multimedia broadcast multicast services acquired by the bearer information acquiring unit and the information of code channels in the additional time slot, the respective multimedia broadcast multicast services on the corresponding complete time slot and the corresponding code channels in the additional time slot for bearing multimedia broadcast multicast services.

A processing unit being added in the above MBMS service transmitting apparatus and the MBMS service receiving apparatus to realize shared time slot transmitting and receiving of the MBMS according to the present invention can be realized by software programs on the one hand, and can also be realized by improving and updating current hardware on the other hand.

In addition, the MBMS transmitting method may combine the above methods and combine other methods for use according to the actual conditions of the MBMS services to be transmitted.

Obviously, one skilled in the art could make various modifications and variations to the present invention without departing from the spirit and the scope thereof. If such modifications and variations to the present invention fall within the scope of the claims of the present invention and the equivalents thereof, the present invention shall also intend to protect such modifications and variations.

What is claimed is:

1. A method for transmitting multimedia broadcast multicast services (MBMS), the method comprising the following steps:

based on a number of MBMS services that are transmitted by a Time Division Duplex (TDD) system under the requirement of a MBMS service center and a data rate the TDD system assigns time slot resources to respective MBMS services to be transmitted, comprising: a repetitive scheduling interval occupied by the respective MBMS services, scheduling starting points of the respective MBMS services in the occupied repetitive scheduling interval, and lengths of the repetitive scheduling interval where the respective MBMS services are borne; wherein, the repetitive scheduling interval can be a Discontinuous Repetition (DRX) cycle in UMTS; and loading each of a plurality of different multimedia broadcast multicast service to be transmitted to a corresponding divided code channel, and transmitting the MBMS to a user equipment based on a single frequency network mode of the multimedia broadcast multicast service.

2. The method according to claim 1, wherein, the step of dividing code channels in a time slot for bearing multimedia broadcast multicast services comprises:

determining a number n of the multimedia broadcast multicast services to be transmitted;

if n=2y (n,y∈N), dividing one time slot for bearing multimedia broadcast multicast services into n code channels, and assigning one code channel for each multimedia broadcast multicast service to be transmitted; and if 2y−1<n<2y, dividing one time slot for bearing multimedia broadcast multicast services into 2y code channels, and assigning the 2y code channels for n multimedia broadcast multicast services to be transmitted.

3. The method according to claim 1, wherein, a numbers of code channels for bearing respective multimedia broadcast multicast services to be transmitted are not equal to each other.

4. The method according to claim 1, further comprising modulating the multimedia broadcast multicast services borne on respective code channels in the time slot for the same multimedia broadcast multicast services based on same scrambling code ID.

5. A method for transmitting multimedia broadcast multicast services (MBMS), the method comprising the following steps:

based on a number of the MBMS services that are transmitted by a Time Division Duplex (TDD) system under the requirement of a MBMS service center and a data rate, the TDD system assigns time slot resources to respective MBMS services to be transmitted, comprising: a repetitive scheduling interval occupied by the respective MBMS services, scheduling starting points of the respective MBMS services in the occupied repetitive scheduling interval, and lengths of the repetitive scheduling interval where the respective MBMS services are borne;

wherein, the repetitive scheduling interval can be a Discontinuous Repetition (DRX) cycle in UMTS; and loading each of the respective plurality of different multimedia broadcast multicast services to be transmitted to a corresponding time slot in a corresponding repetitive scheduling interval, and transmitting the MBMS to a user equipment based on a single frequency network mode of the multimedia broadcast multicast services.

6. The method according to claim 5, wherein, the repetitive scheduling intervals assigned by the Time Division Duplex system for the respective multimedia broadcast multicast services are discontinuous.

7. The method according to claim 5, wherein, the Time Division Duplex system divides the time slot for bearing multimedia broadcast multicast services into code channels, and bears the respective multimedia broadcast multicast services to be transmitted on the divided corresponding code channels.

8. The method according to claim 7, wherein, the step of dividing code channels in the time slot for bearing multimedia broadcast multicast services comprises:

determining the number n of the multimedia broadcast multicast services to be transmitted;

if n=2y (n,y∈N), dividing one time slot for bearing multimedia broadcast multicast services into n code channels, and assigning one code channel for each multimedia broadcast multicast service to be transmitted; and if 2y−1<n<2y, dividing one time slot for bearing multimedia broadcast multicast services into 2y code channels, and assigning the 2y code channels for the n multimedia broadcast multicast services to be transmitted.

9. The method according to claim 7, wherein, the numbers of the code channels for bearing respective multimedia broadcast multicast services to be transmitted are not equal to each other.

10. The method according to claim 7, further comprising modulating the multimedia broadcast multicast services borne on respective code channels in the time slot for the same multimedia broadcast multicast services based on a same scrambling code D.

11. A method for receiving multimedia broadcast multicast services (MBMS), the method comprising the following steps:

a user equipment, based on control information of current respective multimedia broadcast multicast services, acquiring transmission scheduling parameters of the current respective multimedia broadcast multicast services, which comprise:

a Discontinuous Repetition (DRX) Cycle for indicating a repetitive scheduling interval where the current MBMS service is borne, a Start Offset for indicating the offset of the scheduling start of the MBMS service in the DRX Cycle, a continuous scheduling time length Duration for indicating the continuous transmission time of the MBMS service in one cycle, and a next scheduling interval for indicating the next repetitive scheduling interval where the MBMS service is borne, wherein, parameters Start Offset and Duration jointly indicate the time slots for transmitting the MBMS service in the DRX cycle; and based on the indication of the transmission scheduling parameters, receiving each of the respective plurality of different multimedia broadcast multicast services on a corresponding time slot in a corresponding repetitive scheduling interval for bearing the current respective multimedia broadcast multicast service, and preparing to receive the next one of a plurality of different multimedia broadcast multicast services within the next repetitive scheduling interval for bearing the respective multimedia broadcast multicast services.

12. The method according to claim 11, wherein, the user equipment receives the respective multimedia broadcast multicast services based on a discontinuous receiving manner.

13. The method according to claim 11, the method comprising the following steps:

the user equipment, based on the control information of respective multimedia broadcast multicast services, acquiring the information of code channels in a time slot for bearing multimedia broadcast multicast services occupied by the respective multimedia broadcast multicast services; and based on the acquired information of code channels occupied by the respective multimedia broadcast multicast services, receiving respective corresponding multimedia broadcast multicast services on corresponding code channels in the time slot for bearing multimedia broadcast multicast services.

* * * * *